United States Patent [19]

Trapasso et al.

[11] 4,075,387

[45] Feb. 21, 1978

[54] NON-WOVEN FABRIC BINDERS

[75] Inventors: Louis E. Trapasso, Watchung; William B. Horback, Irvington, both of N.J.

[73] Assignee: Celanese Corporation, New York, N.Y.

[21] Appl. No.: 701,314

[22] Filed: June 30, 1976

[51] Int. Cl.$^2$ .................. B32B 27/04; C08L 61/20
[52] U.S. Cl. .................. 428/288; 260/29.4 UA; 260/29.6 RB; 260/29.6 PM; 260/29.6 CM; 428/290
[58] Field of Search ............ 260/29.4 UA, 29.6 RB, 260/29.6 PM; 428/288, 290

[56] References Cited

U.S. PATENT DOCUMENTS

| 3,301,809 | 1/1967 | Goldberg | 260/29.6 |
| 3,345,318 | 10/1967 | Lindemann et al. | 260/29.6 |
| 3,380,851 | 4/1968 | Lindemann et al. | 428/283 |
| 3,451,982 | 6/1969 | Mortimer | 260/80.73 |
| 3,632,787 | 1/1972 | Gesner | 260/29.6 RW |

Primary Examiner—Theodore E. Pertilla

[57] ABSTRACT

Binders for non-woven fabrics prepared from ethylene-vinyl acetate copolymers, a substituted acrylamide monomer and a vinyl ester monomer, reaction being made to take place under controlled conditions to effect over-polymerization.

6 Claims, No Drawings

NON-WOVEN FABRIC BINDERS

BACKGROUND OF THE INVENTION

The era of non-woven fabrics has not been and will not be the result of chance. Ever since man discovered that felt-like products could be made out of animal fibers, e.g., wool and fur, without weaving, there has been a continuing interest in trying to bond other fibers which do not naturally felt. Of course, a long hard look has been taken at papermaking processes wherein cellulosic fibrous materials, such as wood pulp, are inherently readily bonded into a dimensionally strong sheet. By simply beating cellulosic wood fibers, forming a dilute aqueous suspension thereof, and depositing same on a travelling wire-gauze screen or a rotating gauze-covered cylinder, paper sheets having excellent properties may be formed. Wet strength or water resistance is provided in the sheets by adding to the dilute aqueous suspension a small amount of synthetic resin having an affinity for the fibers.

Unfortunately, most of the natural and synthetic fibers presently enjoying great success in the woven fabric industry, such as cotton, cellulose esters, rayons, polyamides, polyesters, polyolefins, acrylics, and the like, do not exhibit this same inherent web-forming characteristic and cannot be beaten into a suspension. Consequently, a number of other methods have been developed, some practical and some not, for binding staple fibers thereof into a web having multi-directional strength.

Conventional carding equipment used in the weaving industry can produce fiber webs of uniform thickness suitable for impregnation with an adhesive or binder, but one drawback is that while lengthwise strength is usually good, cross-direction strength is generally not good at all, owing to the staple fibers being essentially parallel-laid, i.e., lengthwise of the fabric or in the machine direction of the material.

Random distribution of the fibers has been achieved by several methods, one of the most popular of which is that involving air-laying of the fibers by stripping same from a carded web by means of an air stream which then directs the fibers through a restricting throat which is controlled to adjust the thickness of the resulting web. The machine used for this purpose is called a "Rando-Webber" and was developed by a partly named Buresh for the Curlator Corporation.

A number of methods have been developed for treating randomly-dispersed webs with a binder. Typically, a water-based emulsion binder system is used in which a thermoplastic or thermoset synthetic polymer latex is prepared and a loose web of fibers to be treated is immersed therein, using special equipment in view of the structural weakness of the web; the thus treated web is dried and cured to effect proper bonding. Alternatively, an aqueous or solvent solution binder system of a thermoplastic or thermoset resin may be used to impregnate the fibrous web.

Still other methods include the application of thermoplastic or thermoset resin powders to the fibers, before or after making a web of same, and passing the web through hot rolls or a hot press to bind the fibers together. Alternatively, thermoplastic fibers having a softening point below that of the base fibers may be interpersed in a web of the latter and sufficient heat and pressure applied, such as by the use of heated rolls, to soften the thermoplastic fibers and bind the fiber network together.

Commonly used latices for non-woven fabrics are those prepared from polymers of butadiene-styrene, butadiene-acrylonitrile, vinyl acetate, acrylic monomers, such as methyl acrylate, ethyl acrylate, methyl methacrylate, and the like. While the emulsion binder system using latexes is the most popular method of forming non-woven fabrics, the homopolymers, copolymers and terpolymers heretofore used therein have suffered from several or more shortcomings. Since, for example, the end uses to which the non-woven fabrics are put play a major role in determining what polymeric binder is used, it can readily be appreciated that the properties of the polymeric binder are critical. Among the many tests to which non-woven fabrics are subjected are those which determine wet strength, washability, ability to hold up under repeated dry cleaning conditions, color fastness, hand, drape, abrasion resistance, resiliency, etc. Of course, the results of these tests will vary considerably depending upon the base fiber employed, let alone the combination of same with a binder.

Always a real consideration in the selection of binders is the cost thereof. As is well known, non-woven products are presently used, to name a few, as interlinings, wiping cloths, mops, shoe innersoles, book bindings, backings for plastic sheets, liquid filters, sanitary products, ribbons, diapers, battings, insulation, etc. Obviously, the cost of the binder must be consistent with the end use intended for the non-woven fabric. Needless to say, however, as the end uses become more varied and more sophisticated, it can be expected that the price range will react accordingly.

While the acrylic polymer latices hereinbefore mentioned are presently enjoying significant success, it is no secret that the cost thereof is a drawback. Consequently, there is still a real demand for a versatile, effective binder which is not only attractive from a cost standpoint, but which is, for example, capable of bonding fibrous materials into non-woven fabrics and rendering same strong, durable, resistant to water and dry cleaning solvents, soft to the touch, etc. The present invention is directed to these and related goals, as will be more fully understood from the description of the invention which follows.

The following United States patents are deemed of interest: Nos. 3,301,809, 3,380,851 and 3,451,982.

INVENTION

The present invention relates to over-polymerized ethylene-vinyl acetate copolymers suitable as crosslinkable binders for non-woven fabrics. More particularly, the instant discovery concerns the improvement of pre-formed ethylenevinyl acetate emulsions, useful as fiber adhesives, by reacting same with additional vinyl acetate and an N-hydroxyalkyl(lower)-substituted acrylamide or methacrylamide, such as N-methylol acrylamide, each of the reactants being added in controlled amounts under controlled conditions to effect the desired overpolymerization.

With no intention of being held to any particular theory for the reaction mechanism, it is felt that one or more of the following changes takes place in the preformed ethylene-vinyl acetate copolymeric emulsion upon over-polymerization pursuant to the present invention to produce the enhanced non-woven fabric binders of the instant discovery. Quite possibly, encapsulation of the pre-formed ethylene-vinyl acetate particles occurs, as well as the formation of additional, discrete copolymer particles from the added vinyl acetate/N-methylol acrylamide; it is possible that there is some grafting of the vinyl acetate and/or N-methylol acrylamide onto the existing ethylene-vinyl acetate copolymer particles; and, possibly, over-polymerization provides maximum efficiency for cross-linking by virtue of the N-methylol acrylamide monomer being located on the periphery of many of the polymer particles present in the latex. Again, the exact reasons for the enhanced nature of the latices of the present invention is not fully understood.

According to the instant discovery, the ethylene-vinyl acetate copolymer emulsion over-polymerized generally contains about 70 to about 90, preferably from about 70 to about 88, percent by weight vinyl acetate and from about 10 to about 30, preferably from about 12 to about 30, percent by weight ethylene, based upon the total copolymer weight.

While aqueous emulsions of these copolymers presently enjoy a price advantage over the popular acrylic polymer latices hereinbefore alluded to, the ethylene-vinyl acetate copolymers leave something to be desired insofar as tackiness, resiliency, tensile strength, solvent resistance, softness, and the like, are concerned.

Pursuant to the instant discovery, aqueous emulsions or latices of ethylene-vinyl acetate copolymers, generally containing from about 35 to about 67 percent by weight, preferably from about 48 to about 58 percent, of colloidally-suspended ethylene-vinyl acetate particles, are treated with a controlled amount of additional vinyl acetate and an N-hydroxyalkyl(lower) acrylamide or methacrylamide in the presence of a suitable polymerization catalyst and usually at elevated temperatures to over-polymerize the blend and provide the desirable latices. It has been found that best results are achieved when the overpolymerized ethylene-vinyl acetate compositions contemplated herein are latices prepared from, by weight, about 48 to 86 percent ethylene-vinyl acetate copolymer solids; about 10 to about 48 percent by weight added vinyl acetate; and from about 2 to about 6 percent by weight N-hydroxyalkyl acrylamide or methacrylamide, the resulting aqueous emulsion containing from about 35 to about 67 percent by weight, preferably from about 48 to about 58 percent, ethylene-vinyl acetate/vinyl acetate/N-hydroxyalkyl- substituted acrylamide or methacrylamide total dispersed solids. If desired, the vinyl acetate and N-hydroxyalkyl acrylamide or methacrylamide may first be separately polymerized and the resulting copolymer used to over-polymerize the ethylene-vinyl acetate copolymer.

Typical polymerization catalysts useful herein to carry out the over-polymerization reaction are the inorganic peroxides, such as hydrogen peroxide, alkali metal (e.g., sodium, potassium, lithium) and ammonium persulfates, perphosphates, perborates, azonitriles, such as alpha,alpha-azo-bis isobutyronitrile, and the like.

The catalyst concentration must be at least sufficient to initiate the polymerization reaction. Generally, from about 0.001 to about 0.15 percent by weight of catalyst is used, based upon the total weight of the vinyl acetate/N-substituted acrylamide monomers.

Preferably, surfactants are employed to control latex viscosities. Among the desirable surfactants are the non-ionic surfactants, such as the polyethers, e.g., ethylene oxide and propylene oxide condensates in general, including straight and branched chain alkyl and alkaryl polyethylene glycol ethers and thioethers, and polypropylene glycol ethers and thioethers, and more particularly substances such as the Igepal (trademark of GAF Corporation) surfactants which are members of a homologous series alkylphenoxypoly(ethyleneoxy)-ethanols, which series can be represented by the general formula

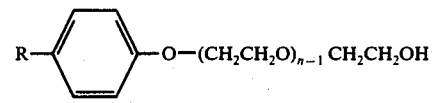

wherein R represents an alkyl substituent and $n$ represents the number of moles of ethylene oxide employed. These non-ionic surfactants include alkylphenoxypoly(ethyleneoxy)-ethanols having alkyl groups containing between about 4 to about 18 carbon atoms and upto about 240 ethyleneoxy units, such as the heptylphenoxypoly(ethyleneoxy)-ethanols, nonylphenoxypoly(ethyleneoxy)-ethanols and dodecylphenoxypoly(ethyleneoxy)-ethanols. Other suitable non-ionic surfactants are the Tween products. Tween is a trademark of Atlas Powder Company denoting polyoxyalkylene derivatives of hexitol (including sorbitans, sorbides, mannitans and mannides) anhydride, partial long chain fatty acid esters, such as the polyoxyalkylene derivatives of sorbitan monolaurate, sorbitan monopalmitate, sorbitan monostearate, sorbitan tristearate, sorbitan monooleate, and sorbitan trioleate.

The preferred concentration of surfactant used in the polymerization step expressed in parts per 100 parts total polymerizable monomer, is in the range of about 3.0 to about 12.0, preferably 3.5 to about 7.0.

Generally reaction is made to take place at a temperature in the range of about 60° C. to about 85° C., preferably about 65° C. to about 80° C. While atmospheric or sub-atmospheric pressures may be used, reaction is preferably carried out at somewhat elevated pressures, such as those which may be provided by an autoclave, preferably below about 85–95 atmospheres.

Pursuant to the instant discovery, the pH when too low is best controlled during polymerization by the use of a small amount of a buffer. Generally pH is maintained in the acid range, about 2 to 6, and the preferred buffers are the alkali (K, Li, Na) acetates, carbonates, bicarbonates, e.g., sodium bicarbonate, potassium carbonate, sodium acetate, and like alkali organic salts.

As suggested hereinbefore, the latices of the present invention are generally prepared using a small but effective amount of a protective colloid. Typically, polyvinyl alcohol, carboxymethyl cellulose, Cellosize WP-09 hydroxyethyl cellulose (sold by Hercules Powder Company, Inc.), etc., are very effective protective colloids. The best suited colloid concentrations, based upon the total weight of vinyl acetate, N-substituted acrylamide, and the colloid, are in the range of about 0.005 to about 0.30 percent by weight.

Sufficient water is present along with the reactant monomers, catalyst, surfactant/s, protective colloid and buffer to provide, upon over-polymerization, an emulsion of desirable consistency and properties. Obviously, the ratio of reactant monomers to water may vary considerably, depending upon the solids content desired in the ultimate emulsion product. Should high solids be wanted, for instance, a monomers to water ratio substantially higher than 1:1 is used. For example, a 60% or higher solids latex is readily achieved by the use of 1.5:1, or higher, monomers to water ratios, assuming the ethylene-vinyl acetate copolymer concentration of the latex to be over-polymerized is in the general range hereinbefore defined.

If desired, a minor amount of defoamer, such as Nopco NDW sold by Nopco Chemical Company, Inc., is added to the blend, Nopco being the trademark for a blend of mixed hydrocarbons, metallic soaps and 0.5% silicone oil. Of course, other similar or suitable defoamers may likewise be used in lieu thereof or in conjunction therewith.

The preformed ethylene-vinyl acetate copolymer emulsions contemplated herein for over-polymerization are well known and are designated by various trademarks. Typical are the ethylene-vinyl acetate emulsions called Aircoflex 400, Aircoflex 500, Aircoflex 510, and Amsco Resin, the Aircoflex products being marketed by Airco Chemicals and Plastics and the Amsco products being sold by the American Mineral Spirits Co., a division of Union Oil Co. of California. These emulsions usually have a polymer (ethylene and vinyl acetate) content in the range hereinbefore stated, the emulsion having a total solids (polymer) content in the range of about 47 to about 65 percent by weight, based upon the total weight of the emulsion, the pH of the emulsion being between about 4 and 5 for storage stability.

Likewise, the product of the present invention, while prepared as described hereinbefore under a broader range of pH conditions, is usually adjusted to between 4 and 6 for storage stability.

Over-polymerization is preferably carried out by initially thoroughly blending, with a suitable preformed ethylene-vinyl acetate emulsion, the emulsifying agents (including surfactants, protective colloid and buffer), a minor proportion, say about 10%, of the vinyl acetate, and about one-half of the catalyst and water. While thoroughly agitating or homogenizing the blend, polymerization is commenced by increasing the temperature of the mixture. Once the desired temperature is reached, uniform incremental addition of the vinyl acetate, water, and the catalyst is commenced and once about one-half of the vinyl acetate is added, delayed addition of the N-hydroxyalkyl acrylamide or methacrylamide is started. Typically, incremental addition may take 3 to 5 hours, the temperature being maintained an additional hour or so after incremental addition is terminated, reaction of the monomers being thus essentially completed.

The inherent viscosity of the over-polymerized latices prepared as taught hereinabove may vary considerably depending upon most of the process variables and concentrations hereinbefore discussed, but in general inherent viscosities in the range of about 0.5 to about 2.0 (I.V. in 80% acetic acid, c = 0.1% at 25° C.) are preferred.

The latexes produced according to the present invention, when compared to the ethylene-vinyl acetate copolymer latices before over-polymerization, exhibit much higher tensile strengths. Catalyzed and cured films prepared from the unique latices of the instant discovery are less tacky, show more resistance to trichloroethylene solvent and are more resistant to water spotting than the ethylene-vinyl acetate latexes from which they are prepared.

Catalysts suitable for curing the binders of the present invention are various organic and inorganic acids, such as oxalic acid, mineral acids (e.g. HCl), acid salts thereof, and the like. Preferably, based upon the total weight of the polymers in the latices, over-polymerized as taught herein, the curing catalyst is present in the concentration of about 0.35 to about 2.5 percent by weight.

Bonding non-woven webs made by a number of processes, such as by the use of the "Rando-Webber" method hereinbefore described, may likewise be carried out in different conventional ways, such as impregnation or printing. For example, a rayon or polyester web weighing about 3 to about 5 ounces per square yard may be immersed in the aqueous over-polymerized latex composition of the present invention, containing a curing catalyst, and from about 15 to about 90 percent, or more, resin on a dry weight basis deposited on the web, preferably from about 25 to about 60 percent resin. Drying and curing of the impregnated web may be accomplished by passing the thus treated web through an air oven (e.g., at a temperature of about 50° C. to about 90° C. for under ten minutes), and then through a curing oven at substantially higher temperature (e.g., at a temperature of about 145° C. to about 155° C. for under about 7 minutes). Of course, drying and curing temperatures and times are selected on the basis of the web thickness, type of base fiber in the web (e.g., polyamide, cotton, poly(ethylene terphthalate), acrylic, polyolefin, etc.), and other like considerations.

EXAMPLES

The present invention will better be understood from the following examples which are intended to be illustrative and not unduly limitative, all percentages given in the examples being by weight unless otherwise indicated. The following are typical commercial ethylene-vinyl acetate latex compositions which are subjected to the over-polymerization processes of the examples infra:

Table I

|  | A[1] | B[2] | C[3] |
|---|---|---|---|
| Polymer Properties | | | |
| Solids, % | 55.1 | 55.0 | 55.1 |
| Viscosity, cp, | 1,820 | 450 | 430 |
| pH | 4.5 | 4.6 | 4.1 |
| Inherent Viscosity[4] | 2.57 | — | 1.81 |
| Ethylene Content, wt. %[5] | 14.0–18.9 | 11.5–13.5 | 15.0 |
| Vinyl Acetate Content, wt. %[5] | 86.0–81.1 | 88.5–86.5 | 85 |
| Film Properties | | | |
| Thickness (mils) | 3.9 | 4.0 | 4.2 |
| Yield (psi) | 86 | 67 | 64 |
| Maximum (psi) | 610 | 560 | 400 |
| Break (psi) | 610 | 560 | 400 |
| Elongation, % | 723 | 887 | 1,131 |

[1] Aircoflex 400 - marketed by Airco Chemicals and Plastics
[2] Aircoflex 500 - marketed by Airco Chemicals and Plastics
[3] Aircoflex 510 - marketed by Airco Chemicals and Plastics
[4] I.V. in 80% Acetic Acid, c = 0.1% at 25° C.
[5] Weight % of polymer
[6] Films cast on melamine-formaldehyde paper. Tensile properties determined at 23° C. by an Instron Tensile Tester on a 15mm wide, approximately 0.0037 inch thick, film. Initial jaw space one inch, elongation rate — two inches/min. Films are aged for various times at room temperature and several days at 23° C. and 50% relative humidity.

EXAMPLE I

A two-liter flask is fitted with a stirrer and two (2) calibrated dropping funnels, the flask having a nitrogen sparge tube in one side thereof and being disposed in a water bath for temperature control. To the flask are charged the following measured components in the sequence and under the conditions described hereinbelow:

| Component | Grams |
|---|---|
| Aircoflex 400 (used as heel) | 436.2 |
| Vinyl acetate | 240.0 |
| N-methylol acrylamide/H$_2$O 60%/40% | 33.3 |
| Water | 188.0 |
| Tergitol NP-14[a] | 2.0 |
| Igepal CO-977[b] (70%) -H$_2$O (30%) | 16.35 |
| Igepal CO-630[c] | 3.00 |
| Cellosize WP-09[d] | 3.85 |
| NaHCO$_3$ | 0.5 |
| Nopco NDW[e] | 0.5 |
| K$_2$S$_2$O$_8$ | 1.2 |
| H$_2$O | 25.0 |

[a]non-ionic surfact. = nonylphenyl-polyethylene glycol ether sold by Union Carbide Corporation
[b]50 moles ethylene oxide/mole nonylphenol (GAF Corporation)
[c]9 moles ethylene oxide/mole nonylphenol (GAF Corporation)
[d]protective colloid-hydroxyethyl cellulose sold by Hercules Powder Company, Inc.
[e]defoamer — a blend of mixed hydrocarbons, metallic soaps and 0.5% silicone oil The surfactants, protective colloid, buffer, defoamer, 86.7 grams of water and the 436.2 grams of ethylene-vinyl acetate copolymer emulsion (Aircoflex 400) are fed to the reactor flask, the surface of the blend is sparged with nitrogen and 24 grams of vinyl acetate and 0.8 gram of dry K$_2$S$_2$O$_8$ added incrementally (0.4 to 0.4) while stirring and commencing temperature increase from the initial 26° C. The balance of the catalyst (0.4 gram) in an aqueous solution comprising a total volume of 25 milliliters and the balance of the vinyl acetate (216 grams) representing a total volume of 230 milliliters are fed incrementally to the initial charge from each calibrated dropping funnel, respectively, when the reactor reaches a temperature of about 74° C. in a period of about 40 minutes. Every ten minutes sufficient of an increment of each component is introduced into the reaction blend to essentially simultaneously complete addition of each within a period of about four hours. After about one-half of the total vinyl acetate component has been introduced into the reaction blend, aqueous N-methylol acrylamide (60%) incremental (every ten minutes) feed is started and the rate controlled to complete addition essentially at the same time as addition is completed with respect to the vinyl acetate and catalyst components. The balance of the water (216 grams) is added incrementally as needed throughout the reaction.

Heating is continued for an additional forty minutes. The resulting latex product has the following polymer composition:

|  | % by weight |
|---|---|
| Ethylene-vinyl acetate copolymer | 48 |
| Vinyl acetate | 48 |
| N-methylol acrylamide | 4 | and may be used as a binder for making non-woven fabrics from a web, the polymeric composition being cured using, say, oxalic acid, as the curing catalyst. The polymer and film properties of the latex formed in this example are shown hereinbelow in Table II.

EXAMPLE II

Example I is repeated in every essential respect with the exception that the ethylene-vinyl acetate latex B of Table I, above i.e., Aircoflex 500, is used in lieu of latex A of said table. Again, the polymer and film properties of the latex formed in this example are shown in Table II, below

EXAMPLE III

Example I is repeated in every essential respect with the exception that the ethylene-vinyl acetate latex C of Table I, above, i.e., Aircoflex 510, is used in lieu of latex A of said table. The polymer and film properties of the latex formed in this example are shown in Table II, below.

Table II

|  | Product of Example I | Product of Example II | Product of Example III |
|---|---|---|---|
| Polymer Properties |  |  |  |
| Solids, % by wt. | 55.3 | 54.4 | 54.7 |
| Viscosity, cp | 17,500 | 4,200 | 670 |
| Inherent Viscosity[a] | 1.5 | 0.75 | 1,46 |
| Film Properties |  |  |  |
| Thickness (mils) | 3.8 | 4.3 | 3.8 |
| Yield (psi)[b] | 327 | 275 | 350 |
| Maximum (psi) | 1,240 | 907 | 1,090 |
| Break, (psi) | 1,240 | 907 | 1,090 |
| Elongation, % | 374 | 380 | 399 |
| Tack[c] | None | None | None |
| Cured[d] Film Properties |  |  |  |
| Thickness (mils) | 3.8 | 4.1 | 3.7 |
| Yield (psi)[b] | 416 | 510[e] | 541 |
| Maximum (psi) | 1,480 | 1,490 | 1,920 |
| Break (psi) | 1,480 | 1,490 | 1,920 |
| Elongation | 546 | 453 | 666 |
| Tack[c] | None | None | None |

[a]I.V. in 80% acetic acid, c = 0.1% at 25° C.
[b]Films cast on melamine-formaldehyde paper. Tensile properties determined at 23° C. by an Instron Tensile Tester on a 15mm wide, approximately 0.0037 inch thick, film. Initial jaw space one inch, elongation rate — two inches/min. Films are aged for various times at room temperature and several days at 23° C. and 50% relative humidity.
[c]Measured as relative tack to finger touch.
[d]Films cured 5 minutes at 121° C. using oxalic acid catalyst (about 1.25% cat. based upon total polymer weight in the latex).
[e]Different substrate used, viz., Fluoroglass fabric instead of mealamine-formaldehyde paper.

Example IV

A two-liter flask is fitted with a stirrer and two calibrated dropping funnels, the flask having a nitrogen sparge tube in one side thereof and being disposed in a water bath for temperature control. To the flask are charged the following measured components in the sequence and under the conditions described hereinbelow:

| Component | Grams |
|---|---|
| Aircoflex 500 (430.0 solids 351.8 H$_2$O) | 781.8 |
| Vinyl acetate | 50.0 |
| N-methylol acrylamide/H$_2$O; 60%/40% | 33.3 |
| H$_2$O (used to dissolve catalyst) | 30.4 |
| K$_2$S$_2$O$_8$ | 0.4 |

Example I is repeated in every essential respect with the exception that no protective colloid or surfactants are used. All of the Aircoflex 500 emulsion, 10% of the vinyl acetate, and 25% of the catalyst (in H$_2$O) are fed initially to the reactor, the surface of the blend being sparged with nitrogen during and after addition of the vinyl acetate and catalyst, and the temperature of the bath and reactor increased from 26° C. to 74° C. in about 55 minutes. At this point incremental (every ten minutes) addition of the remainder of the vinyl acetate (50 milliliters; 45 grams) and catalyst-H$_2$0 solution (30.5 milliliters), as well as the N-methylol acrylamide-H-hd 2O (31.0 milliliters; 33.3 grams), is commenced and sufficient increments fed, with agitation, to simultaneously complete addition of all three components in 40 minutes. Temperature of the reactor is maintained at 74° C. throughout incremental addition and for about an additional hour and twenty minutes after total addition. During the extra heating period a pinch of $K_2S_2O_8$ catalyst solids is added.

The resulting latex product is cooled and has the following polymer composition:

|  | % by weight |
|---|---|
| Ethylene-vinyl acetate copolymer | 86 |
| Vinyl acetate | 10 |
| N-methylol acrylamide | 4 |

The polymer and film properties of this latex are shown in Table III, below.

EXAMPLE V

Example IV is repeated in every essential respect with the exception that Aircoflex 510 is used; an 86/10/4 latex product is likewise produced, the polymer and film properties thereof being shown in Table III, below.

Table III

|  | Product of Example IV | Product of Example V |
|---|---|---|
| Polymer Properties |  |  |
| Solids, % by wt. | 51.2 | 54.7 |
| Viscosity, cp | 3,800 | 790 |
| Film Properties |  |  |
| Thickness (mils) | 3.8 | 3.6 |
| Yield (psi)[a] | 69 | 102 |
| Maximum (psi) | 320 | 409[c] |
| Break (psi) | 320 | 409[c] |
| Elongation, % | 856 | 1,360[c] |
| Tack[b] | v.s. | s |
| Cured[d] |  |  |
| Film Properties |  |  |
| Thickness (mils) | 3.7 | 3.8 |
| Yield (psi) | 62 | 217 |
| Maximum (psi) | 921 | 986[e] |
| Break (psi) | 921 | 986[e] |
| Elongation (%) | 1,116 | 1,360[e] |
| Tack[b] | tr-n | tr |

[a]Films cast on melamine-formaldehyde paper. Tensile properties determined at 23° C. by an Instron Tensile Tester on a 15mm wide, approximately 0.0037 inch thick, film. Initial jaw space one inch, elongation rate — two inches/min. Films are aged for various times at room temperature and several days at 23° C. and 50% relative humidity.
[b]v.s. = very slight; s = slight; tr-n = trace to none; tr = trace — measured as relative tack to finger touch.
[c]Samples attained a maximum average load of 409 psi at a maximum machine extension of 1,360%.
[d]Films cured 5 minutes at 121° C. using oxalic acid catalyst (about 1.25% cat. based upon total polymer weight in the latex).
[e]Samples attained a maximum average load of 986 psi at a maximum machine extension of 1,360%.

EXAMPLE VI

Example IV is repeated in every essential respect with the exception that Aircoflex 400 is used; the amount of vinyl acetate added is 60.0 grams (6.0 grams initially and 54.0 grams delayed); the amount of N-methylol acrylamide/H$_2$O (60/40) added is 16.6 grams (15.6 milliliters); temperature is increased from 24° C. to 74.0° C. in about one (1) hour and 15 minutes; 48 grams of water used to dissolve catalyst; and temperature in the range of 74° C. to 70° C. maintained for about 40 minutes after complete incremental addition of vinyl acetate/N-methylol acrylamide/catalyst. An 86/12/2 latex composition, i.e., ethylene vinyl acetate/vinyl acetate/N-methylol acrylamide, is produced having the polymer and film properties shown in Table IV, below.

EXAMPLE VII

Example VI is repeated in every essential respect with the exception that Aircoflex 500 is used; and 86/12/2 latex is likewise produced having the polymer and film properties shown in Table IV, below.

EXAMPLE VIII

Example VI is repeated in every essential respect with the exception that Aircoflex 510 is used; and 86/12/2 latex is likewise produced having the polymer and film properties shown in Table IV, below.

Table IV

|  | Product of Example VI | Product of Example VII | Product of Example VIII |
|---|---|---|---|
| Polymer Properties |  |  |  |
| Solids, % by wt. | 55.0 | 49.6 | 54.3 |
| Viscosity, cp | 1,670 | 1,195 | 550 |
| Film Properties |  |  |  |
| Thickness, mils | 3.8 | 4.0 | 3.6 |
| Yield (psi) | 97 | 62 | — |
| Maximum, (psi) | 594 | 534 | 790[e] |
| Break (psi) | 594 | 534 | 790[e] |
| Elongation, % | 952 | 1,133 | 1,230 |
| Tack[b] | Trace | Trace | Trace |
| Cured[d] |  |  |  |
| Film Properties |  |  |  |
| Thickness (mils) | 3.8[d] | 4.1[d] | 4.0[d] |
| Yield (psi)[a] | 130 | 66 | — |
| Maximum (psi) | 778 | 954 | 1,109–1,521[b] |
| Break (psi) | 778 | 954 | 1,109–1,521[b] |
| Elongation, % | 592–744 | 1,032 | 1,214–1,230[b] |
| Tack[b] | None | None | None |

[a]Films cast on melamine-formaldehyde paper. Tensile properties determined at 23° C. by an Instron Tensile Tester on a 15mm wide, approximately 0.0037 inch thick, film. Initial jaw space one inch, elongation rate — two inches/min. Films are aged for various times at room temperature and several days at 23° C. and 50% relative humidity.
[b]Measured as relative tack to finger touch.
[c]Films cured 5 minutes at 121° C. using oxalic acid catalyst (about 1.25% cat. based upon total polymer weight in the latex).
[d]Film cast on Fluoroglass fabric surface.
[e]Samples attained a maximum average load of 790 psi at a maximum machine extension of 1,230%.
[f]One sample broke at a load of 1,521 psi and gave an elongation of 1,214% while four samples attained an average load of 1,109 psi at a maximum machine extension of 1,230%.

As is evident from the above examples and tables, enhanced properties of the type hereinbefore discussed are realized by the control over-polymerization process of the present invention.

Pursuant to statutory requirement, there are described above the invention and what are now considered its best embodiments. It should be understood, however, that the invention can be practiced otherwise than as specifically described, within the scope of the appended claims.

What is claimed is:

1. An aqueous polymer emulsion, suitable for binding loosely assembled fibrous webs into non-woven fabrics, which is prepared by over-polymerizing, in the presence of a polymerization catalyst and at elevated temperatures, a pre-formed aqueous ethylene-vinyl acetate copolymer emulsion containing about 70 to about 90 percent, by weight, vinyl acetate and about 10 to about 30 percent, by weight, ethylene, based on the total copolymer weight of the preformed emulsion, with about 10 to about 48 percent, by weight, vinyl acetate, and about 2 to about 6 percent, by weight, on an N-hydroxyalkyl(lower) acrylamide or methacrylamide, based on the total weight of the ethylene-vinyl acetate copolymer/vinyl acetate/N-hydroxyalkyl acrylamide or methacrylamide components.

2. The aqueous over-polymerized emulsion of claim 1, wherein the pre-formed copolymer emulsion contains from about 35 to about 67 percent, by weight, of colloidally-suspended ethylene-vinyl acetate polymer solids.

3. The aqueous over-polymerized emulsion of claim 1 prepared from about 48 to 86 percent by weight ethylene-vinyl acetate copolymer solids. wherein the resulting aqueous over-polymerized emulsion contains from about 35 to about 67 percent by weight ethylene-vinyl acetate/vinyl acetate/N-hydroxyalkyl acrylamide total dispersed solids. pg,27

4. A non-woven fabric formed from a fibrous web bound together by the cross-linkable ethylene-vinyl acetate/vinyl acetate/N-hydroxyalkyl acrylamide polymeric solids composition of claim 3.

5. The aqueous over-polymerized emulsion of claim 3 wherein the N-hydroxyalkyl acrylamide component is N-methylol acrylamide.

6. The non-woven fabric of claim 4 wherein the N-hydroxyalkyl acrylamide of the polymeric solids binder composition is N-methylol acrylamide.

* * * * *